United States Patent [19]

Hedrick et al.

[11] 4,034,015

[45] *July 5, 1977

[54] ESTER TERMINATED TERPOLYMERS

[75] Inventors: Ross M. Hedrick, Creve Coeur; James D. Gabbert, St. Louis, both of Mo.

[73] Assignee: Monsanto Company, St. Louis, Mo.

[ * ] Notice: The portion of the term of this patent subsequent to Jan. 21, 1992, has been disclaimed.

[22] Filed: Oct. 22, 1974

[21] Appl. No.: 516,941

Related U.S. Application Data

[63] Continuation of Ser. No. 423,639, Dec. 10, 1973, abandoned.

[52] U.S. Cl. .................... 260/857 PG; 260/39 R;
                                                    260/78 L
[51] Int. Cl.$^2$ ..................................... C08L 77/02
[58] Field of Search ................. 260/857 PG, 78 L

[56] References Cited

UNITED STATES PATENTS

| | | | |
|---|---|---|---|
| 2,174,527 | 10/1939 | Peterson | 260/78 R |
| 3,366,608 | 1/1968 | Lincoln | 260/857 PG |
| 3,384,681 | 5/1968 | Kobayashi | 260/857 PG |
| 3,522,329 | 7/1970 | Okazaki | 260/857 PG |
| 3,549,724 | 12/1970 | Okazaki | 260/857 PG |
| 3,636,135 | 1/1972 | Garforth | 260/857 PG |
| 3,639,502 | 2/1972 | Okazaki | 260/857 PG |
| 3,862,262 | 1/1975 | Hedrick et al. | 260/857 PG |
| 3,944,629 | 3/1976 | Hedrick et al. | 260/857 PE |

*Primary Examiner*—Howard E. Schain
*Assistant Examiner*—W. C. Danison, Jr.
*Attorney, Agent, or Firm*—Henry Croskell

[57] ABSTRACT

Lactam-polyol-polyacyl lactam or lactam-polyol-acyl polylactam terpolymers having up to 100% ester end group termination, and both ester linkages and amide linkages between the monomeric segments are disclosed. Also disclosed is a process for preparing the above terpolymer comprising reacting together a lactam, polyol, polyacyl lactam or acyl polylactam, and an alcohol in the presence of a basic lactam polymerization catalyst.

30 Claims, No Drawings

ESTER TERMINATED TERPOLYMERS

This is a continuation, of application serial No. 423,639 filed Dec. 10, 1973, now abandoned.

BACKGROUND OF THE INVENTION

This invention pertains to lactam-polyol-polyacyl lactam or lactam-polyol-acyl polylactam terpolymers having up to 100% ester and group termination and their process of preparation.

Polyamides comprise a large class of polymers having a wide range of properties. Many polyamides have excellent combinations of properties for particular applications. One important class of polyamides are the polylactams prepared by the polymerization of lactams such as caprolactam and the like. Polycaprolactam more commonly known as nylon 6, is the most widely used of the polylactams because of its excellent mechanical and physical properties and its low cost. Because of the many desirable properties of polylactams, polylactams other than polycaprolactam have been used to a considerable extent when nylon 6 is unsuited to some specific end use. Nylon 12, manufactured from lauryllactam or 12-aminododecanoic acid, is an example of such a polymer. The foregoing polymer is characterized by lower water absorption and consequently better dimensional stability and electrical properties than nylon 6. Nylon 12 is also more flexible and lower melting than nylon 6.

For still other applications, a polyamide having a higher water absorption coupled with a higher elasticity than nylon 6 would be useful for a number of applications. Some nylon copolymers are known to provide the characteristics just mentioned. Polyamide-polyether copolymers are known to have a combination of properties making them suitable for use as fibers, fabrics, films and molded articles. It is also known that lactam-polyol copolymers can be prepared by the base catalysis of lactams in the presence of polyalkylene glycols or other polymerizable polyol intermediates using isocyanate initiators. This method of polymerization yields a block copolymer with a number of good properties at a reasonable cost. One of the principal disadvantages of the polylactam-polyether copolymers prepared by this method has been the poor heat stability of the copolymers.

SUMMARY OF THE INVENTION

If a means could be found for improving the heat stability of lactam-polyol-copolymers prepared by an anhydrous, anionic-catalyzed polymerization, it would represent a significant advance in state of the art. Providing a heat-stable lactam-polyol-polymer constitutes one of the principal objectives of this invention.

The present invention pertains to lactam-polyol-polyacyl lactam or lactam-polyol-acyl polylactam terpolymers having up to 100% ester in group termination, and both ester linkages and amide linkages between the monomeric segments of the terpolymer.

The invention also pertains to a process for preparing the above polymers comprising reacting together a lactam monomer, a polyol, an acyl polylactam or polyacyl lactam, and an alcohol in the presence of a base catalyst for the anhydrous polymerization of a lactam.

Related terpolymers and processes for preparing same are disclosed in pending U.S. applications, Ser. No. 341,215, filed Mar. 14, 1973, now abandoned, entitled "Lactam-Polyol-Polyacyl Lactam Terpolymers;" and U.S. application Ser. No. 423,591, filed Dec. 10, 1973, entitled "Lactam-Polyol-Acyl Polylactam Terpolymers," both of which are hereby incorporated by reference. Ser. Nos. 341,215 and 423,591 were filed by Applicants Ross M. Hedrick and James D. Gabbert and are incorporated herein for the purpose of more fully disclosing the background of the invention. Since the lactam-polyol-polyacyl lactam terpolymer of Ser. No. 341,215 and the lactam-polyol-acyl-polylactam terpolymer of Ser. No. 423,591 are related to the ester terminated terpolymers of the invention, incorporation of the discussions of the polyol, the acyl polylactam, and the polyacyl lactam components as well as their influence on the physical profile of these related terpolymers is thought to be relevant to the invention.

DESCRIPTION OF THE PREFERRED EMBODIMENTS

The polymerized lactam component of the above polymers is formed from cyclic monomeric lactams of the formula

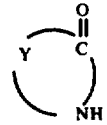

where Y is an alkylene group having at least about three carbon atoms, preferably from about 3 to 12 or 14, and more preferably from about 5 to about 11, carbon atoms.

A preferred monomer is $\epsilon$-caprolactam. Lactam monomers in addition to $\epsilon$-caprolactam include $\alpha$-pyrrolidinone, piperidone, valerolactam, capryllactam, lauryllactam and the like. In addition to lactams unsubstituted on their carbon chains, lactams having substituents on the carbon chain which do not inhibit or otherwise adversely affect the polymerization of the lactam are also included within the scope of this invention.

During polymerization the cyclic lactam ring is opened to provide the following monomeric unit

which, together with other lactam molecules, produces a polymeric block of the formula

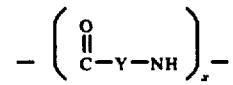

where $x$ is an integer greater than one.

The monomeric lactam unit can also react with the polyacyl lactam. Similarly, a polylactam block, when joined with a polyacyl lactam, forms a polymer segment of the formula

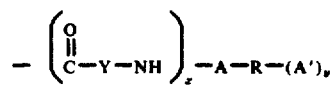

where R is a hydrocarbon group described hereinbelow, A and A' are acyl groups, $x$ is an integer greater than one and $y$ is an integer equal to or greater than one.

The monomeric lactam unit can also react with the acyl polylactam. Similarly, a polylactam block, when joined with an acyl polylactam, forms a polymer segment of the formula

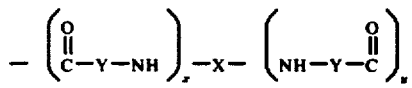

where X is an acyl group, $x$ is an integer greater than one and $y$ is an integer equal to or greater than one.

Thirdly, in the course of the polymerization of the components described above, a polyol can react with the polymerizable lactam unit or block to produce a polymer segment of the formula

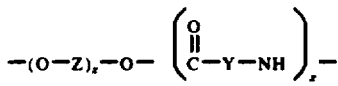

where $x$ and $z$ are integers equal to at least one and where Z is a hydrocarbon, substituted hydrocarbon or acylated hydrocarbon group which, together with the oxygen atom attached thereto, forms a polyether or polyester segment of a polymer molecule.

The Z hydrocarbon, substituted hydrocarbon and acylated hydrocarbon groups can be of any size but are preferably limited to about six carbon atoms. Even more preferred are unsubstituted aliphatic groups such as methylene, ethylene, propylene, butadienyl and the like. Other suitable Z groups include phenylene chlorophenylene, tolylene, isobutylene, isopropylene, ethylcarbonyl, propylecarbonyl, ethylsulfonyl, propylthiocarbonyl and the like.

The preference indicated above for unsubstituted aliphatic Z groups means that terpolymers of this invention which contain polyether segments are preferred over other embodiments which contain polyester segments.

The fourth process reagent is a monofunctional alcohol which can be added any time prior to or simultaneously with the lactam polymerization catalyst. Typical alcohols which are operable according to the inventive process for the preparation of at least a partially ester terminated terpolymer are monydrici aliphatic end substituted aliphatic alcohols, e.g., methanol, ethanol, 1-propanol, 2-propanol, 1-butanol, 2-ethyl-hexanol, 1-dodecanol, 1-octadecanol, 2-octanol, 1-decanol and the like, and admixtures of isomers thereof. Unsaturated alcohols, for example, allyl alcohol, methyl alcohol, nitro alcohols, amino alcohols, for example dimethyl aminoethanol, and the like are considered to be operable. Other operable monofunctional alcohols can be selected from monohydric polymers, for example tridecanolethylene oxide condensates (polyoxyethyelene). In addition to the examplary listing above, monohydric alcohols which do not dehydrate readily are also desirable. Aromatic alcohols such as phenol and/or cresol are not suited for the invention, however, aromatic radicals can be included in the hydrocarbon R groups of the monohydric alcohol ROH wherein the OH is not connected directly to the aromatic grouping.

Preferably, the monohydric alcohol is one which is soluble in the lactam polymerization system and the use of the alcohol varies considerably depending upon the nature of the end product desired. Alcohol presence may vary from about 0.1% to about 150% of the molar equivalents of imide from excess acyl polylactam or polyacyl lactam based on the molar equivalents of hyroxyl from polyol present in the reaction admixture. The number of acyl lactam groups, i.e. imide groups, in excess of polyol contributed hydroxy groups determines the number of terpolymer end groups, thus determining the amount of monohydric alcohol required. Depending upon the presence of alcohol in the reaction admixture, the terpolymer will be comprised of from about 0.1% to about 100 ester end groups. The presence of alcohol in the reaction admixture provides conditions wherein the alcohol reacts with the imide in the formation of ester groups, however, this reaction proceeds very slowly without the presence of the basic lactam polymerization catalyst. In order to achieve the at least partially ester terminated terpolymer according to the invention, the presence of the lactam polymerization catalyst is necessary for the ester formation as well as the terpolymer formation. For example, the preferred polymerization temperatures of this system are from about 90° to about 190° C and more preferably from about 120° to about 180° C. Under these temperature conditions the monofunctional alcohol reacts very slowly with the imide in the formation of ester groups, however in the presence of the lactam polymerization catalyst the ester formation proceeds rapidly and according to the invention.

In preferred aspects of this invention, it is theorized that the lactam is present in the polymer in the form of polylactam blocks which are alternated with blocks of polyol to form the polymer. The polylactam blocks when present can be of any size but customarily have molecular weights of at least about 500, preferably at least about 1000.

The polymerized polyol components of the polymers of this invention are formed from polyol intermediates having at least two hydroxy groups. Included within the scope of the above class are a large number of suitable compounds ranging from the simple diols such as ethylene glycol to complex polymeric polyols such as poly (ε-caprolactone) diol. Other polyol compounds include alkylene glycols such as diethylene glycol, triethylene glycol, tetraethylene glycol, tetramethylene glycol, propylene glycol, dipropylene glycol, hexylene glycol, 1,2-propanediol, 1,3-propanediol, 1,3-hexanediol, 1,5-pentenediol, butylene glycol, 1,4-butanediol, dicyclopentadiene glycol, heptaethylene glycol, and isopropylidene bis (p-phenyleneoxypropanol-2); diol other than alkylene glycols such as hydroxyethyl acrylate and hydroxypropyl methacrylate; polyols having more than two hydroxy functions such as glycerol, pentaerythritol, 1,2,6-hexanetriol, and 1-trimethylol propane; polymeric polyols such as polyethylene glycols, polypropylene glycols, polyoxypropylene diols and triols, polytetramethylene glycols, castor oils, polybutadiene glycols and polyester glycols, and a large number of compounds containing substituents other than hydroxy groups such as 2,4-dichlorobutylene glycol. In addition to all the hydroxy compounds set forth above, the thio compounds analogous to the above compounds having sulfur atoms in place of oxygen are also included within the scope of the invention. A few examples include hydroxyethyl thioglycolate, ethylene glycol bis-(thioglycolate); pentaerythritol tetrakis-(thioglycolate) and thiodiglycol.

If the polyol intermediate is a polymer, the molecular weight of the polyol can be any amount. Commercially available polymeric polyol compounds have molecular weights from 200 to 5000, but polymers with molecular weights outside that range are also useful in the practice of the instant invention.

The third component of the terpolymers of this invention has the following structural configuration in the polymer chain:

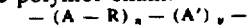

where R is a hydrocarbon group, A and A' are acyl radicals, y is an integer equal to at least one, and n is an integer equal to zero or one.

The R group can be any hydrocarbon group having at least two valence bonds for attachment to the acyl groups shown in the above formula. Examples include functional groups obtained by the removal of hydrogen atoms from methane, ethane, propane, hexane, dodecane, benzene, toluene, cyclohexane and the like. The R group can be of any size but is preferably limited to about twenty carbon atoms, and more preferably about eight carbon atoms. If the integer y is one, the linkage will be a diacyl group. The A groups can be any acyl group and preferably are

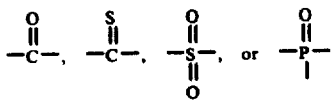

groups. Most preferred among the above groups is the carbonyl groups.

Values for the integer y have a direct relationship to the thermoplasticity of the terpolymer. The higher the value of y, the more highly crosslinked will be the finished polymer. Values for y can be as high as six or eight, but more preferably do not exceed two or three.

there will be only two amide groups attached to the carbonyl group.

The polymerized product comprising the aforementioned components can have a number of different structures depending upon the process conditions and the relative proportions of ingredients used in the reaction system. Polymers can be prepared having relatively small segments of lactam units joined to similarly short segments of polyol units through the polyacyl linkage described above. Or large segments of one polymeric component can be combined with a larger number of comparatively small segments of another polymeric unit, which small segments are joined to one another through the polyacyl or acyl linkages as well as to the other type of polymeric component. Or segments of varying sizes of both the lactam and the polyol polymeric units can be combined through the polyacyl components to form a highly random terpolymer. Another form of polymer within the scope of this invention are block polymers, where moderately large size blocks or segments of the lactam and polyol polymeric units are positioned alternately in the polymer chain and joined through the polyacyl or acyl groups described above. If the polyacyl or acyl linkages are, for purposes of simplification, considered to be a part of either a lactam or polyol block, then the block polymers of this invention can be discussed in terms of two alternating blocks designated as A and B blocks, instead of in terms of complicated patterns of three blocks designated as A, B and C blocks. Block polymers of this invention can have three general structural configurations, AB, ABA and a repeating pattern of AB segments. Following a general characterization of a block copolymer within the scope of this invention as AB, ABA or repeating AB, it should be recognized that the exact structural configuration may vary somewhat from the general characterization of the polymer. As an illustration, one theoretical formula for a lactam-polyol-polyacyl lactam or lactam-polyol-acyl polylactam block terpolymer of the repeating AB type could be

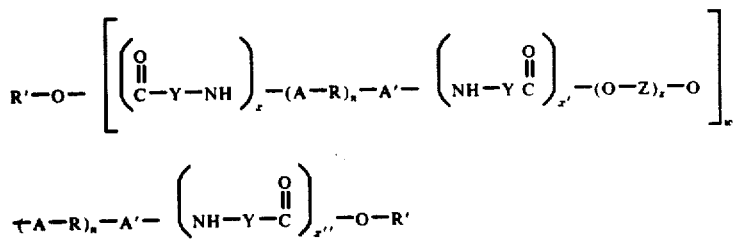

However, when n is equal to zero, and A' is an acyl group, for example, a phosphoryl group,

there will be another group attached to the phosphorus atom in addition to the two amide groups. The additional group can be either another amide group or some other group such as hydrogen, halogen, or monovalent hydrocarbon. When A' represents a carbonyl group,

where $x$, $x'$, $x''$, $z$ and $w$ are all integers equal to one or more; $n$ is an integer equal to zero or one; R and Z are divalent hydrocarbon groups; Y is an alkylene group having at least three carbon atoms; A and A' are acyl groups; and R' is an aliphatic or substituted aliphatic hydrocarbon wherein the ester group is attached to other than a cyclic or aromatic radical with R' corresponding to the R of the monohydic alcohol, R OH utilized according to the inventive process.

If for instance Y is a straight chained amylene group, A and A' are carbonyl groups, Z is ethylene, —CH$_2$C-

$H_2-$, and R is phenylene, the terpolymer would be a caprolactam-ethylene glycol polymer where the caprolactam segments of the polymer are joined to one another and to the ethylene glycol segments through terephthaloyl linkages. Other lactam-polyol polymers, both of the AB, ABA as well as the repeating AB type, will become immediately apparent to those skilled in the art in view of this disclosure. It should therefore be noted that the above structural formula is set forth for illustrative purpose only, and is not intended as a limitation of the polymers within the scope of the invention.

When the polymers of this invention are of the ABA type, where one block of one type of polymer segment is located between two blocks of the other type of polymer segment, the polymers can be of either the poly-lactam-polyol type or the lactam-polyol-lactam type. Of the two types, the latter is a preferred type of ABA polymer.

If the lactam-polyol-polyacyl lactam or lactam-polyol-acyl polylactam polymer is a block polymer the polyol blocks can, like the polylactam blocks, be of any size but customarily have molecular weight of at least about 500, preferably at least about 1000. The ratio of the number of lactam to polyol blocks can also vary. Since the block polymers can be of either the type designated as AB, ABA or repeating AB, the ratio of lactam blocks to polyol blocks can vary from 2:1 to 1:1 to 1:2. Mixtures of two or more block polymers having different ratios of the lactam and polyol blocks will produce ratios of polymer blocks intermediate between the above stated ratios.

In the above theoretical formula for a lactam-polyol block terpolymer, the polyacyl linkage is represented as located between two lactam polymer segments as well as between a polyether segment and a lactam polymer segment. As a practical matter, the polyacyl or acyl linkages will also be located occasionally between two polyol blocks. It should be noted, moreover, that the polyacyl acyl linkages need not invariably be positioned between lactam and polyol blocks since the necessary ester or amide linkage can be provided in the form of an ester linkage by the oxygen atom of the polyether segment and the carbonyl group of a polylactam segment.

As mentioned earlier, the terpolymers of this invention are characterized by the presence of both ester and amide linkages between the monomeric segments of the polymer. The term "monomeric segment" is intended to apply to the polymerized reaction product of a monomer, whether the reaction product is a single unit such as

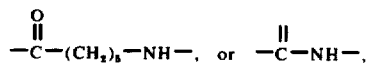

or a block of several units such as

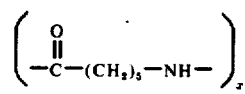

Regarding the breadth of the terms ester linkage and amide linkage, the linkage can of course be composed of acyl groups other than carbonyl groups since the polyacyl or acyl linkages described above includes thiocarbonyl, sulfonyl, and phosphoryl groups as well as the more conventional carbonyl groups.

The molecular weight of the terpolymers can vary widely from a number average molecular weight of just a few thousand to one million or higher. For thermoplastic uncrosslinked polymers, a preferred range for number average molecular weight is from about 10 or 20,000 to about 100,000 to 200,000. If the polymers are crosslinked, the molecular weights of the polymers can be much higher in the range of 100,000 to several million.

When block polymers are formed, the molecular weight of the polyol blocks is an important consideration in selecting preferred polymers within the scope of this invention. Polyol blocks having a number average molecular weight of about 500 or 600 generally tend to have particularly good low temperature properties. This minimum level of molecular weight for the polyol blocks is subject to some variation insofar as low temperature properties can also be affected by the degree of block polymerization, the nature of the block polymer, i.e. AB, ABA or repeating AB, the ratio of the lactam content to the polyol content, and the particular lactam and polyol present in the polymer. Regarding a maximum molecular weight of the polyol blocks, preferred polymers have polyol blocks with a maximum number average molecular weight of about 6000, and more preferably about 4000. Above these levels the polyol prepolymer tends to exhibit a reduced hydroxyl functionality, thereby making more difficult the incorporation of polyol into the polymer.

In addition to the three principal monomeric constituents which together produce the terpolymers of this invention, other polymerizable monomers can also be used to prepare polymers having four or more polymerizable constituents. As an example, if the polyol constituent of a terpolymer of this invention is polybutadiene diol, the resultant terpolymer could be, after the lactam-polyol-polyacyl lactam or lactam-polyol-acyl polylactam polymerization, subsequently reacted with a vinyl compound such as styrene to crosslink the polymer through its vinyl unsaturation. Still other monomers could be chosen which could be polymerized directly into a linear polymer chain. The quantity of such additional monomers could be very large, even as great as 50% or more of the total polymerizable constituents but preferably is limited to quantities of 25% or less of the total monomer content.

The polymers of this invention exhibit a broad range of properties which can be adjusted to provide compositions particularly well adapted for a specified end use. In addition to crosslinking, adjustment of polymer structure, and molecular weight adjustment of polymer blocks, other means of varying the properties of the polymers can also be employed. Crystallinity of the polymers, which can be present in the lactam segments of the polymers, can be increased or decreased by variation of polymerization temperatures. Since any crystallinity in the polymers of this invention is largely present in the lactam segments of the polymer, variation of the lactam content of the polymer can also result in a variation of polymer crystallinity. Polymers with relatively high degrees of crystallinity tend to be strong, rigid polymers whereas those with little or no crystallinity are more elastomeric in nature.

As mentioned earlier, the type of lactam, polyol and polyacyl lactam components can also affect the properties of the finished polymer. As an example, polyethylene glycol polymer segments tend to produce polymers with a high water absorptivity whereas polypropylene glycol or polytetramethylene glycol polymer segments produce polymers with comparatively low water absorptivities. As another example, caprolactam polymer segments in the polymers of this invention produce polymers which are stronger and more rigid than homologous polymers containing segments of a higher lactam such as caprylactam or dodecanolactam. With respect to the polyacyl lactam or acyl polylactam, an aromatic hydrocarbon group between the acyl lactam groups will produce a more rigid terpolymer than will a polyacyl lactam or acyl polylactam with a long-chain aliphatic group. Even more significantly, use of a lactam will yield an essentially linear polymer whereas use of a tris or tetrakislactam will result in a branched or crosslinked terpolymer. Similarly bis-lactams can be employed to produce a branched or crosslinked polymer. Highly crosslinked polymer can be made through the use of polyols having more than two hydroxy groups.

With all of the foregoing techniques available for modifying and adjusting the properties of the polymers of this invention, it can be appreciated that the polymers can be used in a number of end use applications. One such use is as textile fiber. Throughout the entire range of ratios of polymeric components, from polymers containing very little polyether component to those containing a large amount, the polymers have properties which make them useful as textile fibers. In addition to being the sole constituent of a textile fiber, the terpolymers can also be used as one component in a composite or conjugate fiber. It is contemplated that conjugate fibers of nylon and the terpolymers of this invention will be particularly useful in a number of textile and other applications. Other textile applications for the terpolymers include their use in the manufacture of non-woven fabrics and as high moisture regain fibers. The terpolymers can also be manufactured into foamed articles, either during or after their polymerization, to produce rigid and flexible foams. Because of their method of preparation directly from the monomeric components, the polymers can be prepared in large shapes such as furniture and furniture components and automobile parts. The terpolymers can also be produced in the form of molding resins which can subsequently be molded by injection molding, extruding, thermoforming or other techniques to produce products of virtually any shape. The more highly elastomeric compositions can be used in the manufacture of automobile tires and tire components. The polymers can also be modified with fillers, fibers, pigments, dyes, stabilizers, plasticizers, flame retardant and other polymeric modifiers to alter their properties and thereby enlarge even further the scope of their applicability. One such modification comprises reinforcing the polymers with fillers or fibers which have been treated with coupling agents capable of increasing the bonding of the fillers or fibers to the polymer molecules. A large number of organosilane compounds have been found to be especially capable of performing this task of improving adhesion between polymer and filler or fiber. Examples of some suitable organosilane couplers for use with the polymers of this invention include 3-aminopropyl triethoxysilane, glycidoxypropyl trimethoxysilane and N-trimethoxysilylpropyl-N-β-aminoethyl)-amine. Preferred fillers and fibers include quartz, wollastonite, feldspar, calcined kaolin clay, glass fibers and other high performance fibers such as graphite, boron, steel and the like. The concentrations of fillers and fibers can vary from very small amounts such as one or two volume percent up to 70 or 80 volume percent or more.

The polymers are prepared by mixing together lactam monomer, polyol, lactam polymerization catalyst and a polyacyl lactam of the formula

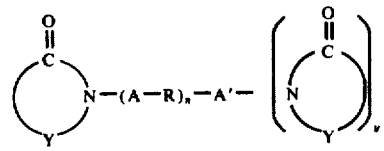

where A is an acyl group selected preferably from

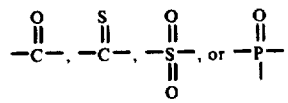

where Y is an alkylene group having at least about three carbon atoms, where R is a hydrocarbon group, where y is an integer equal to at least one, and n is an integer equal to zero or one and conducting the polymerization of the lactam, polyol, polyacyl lactam or acyl polylactam, and alcohol under conditions which will cause the lactam to polymerize.

Polymerization temperatures can vary from the melting point of the lactam or less up to the melting point of the resultant polymer or more. Depending upon the particular ingredients being used, this can encompass a range from 70° to 230° C or more. Preferred polymerization temperatures are from about 90° to about 190° C, an more preferably from about 120° to about 180° C for caprolactam terpolymers. Even more preferred is a polymerization where the temperature is increased during the polymerization from an initial temperature of from about 70° to about 100° C at the beginning of the polymerization to a final temperature of about 150° to 180° C. Such a technique produces a rapid polymerization of a terpolymer having high strength and modulus.

Times required for complete polymerization will vary considerably depending upon polymerization temperatures and the specific ingredients used in the polymerization system. Total polymerization time can be as little as 30 seconds or less, preferably from 1 to 10 minutes, and can be extended to any duration up to several days or more. Generally, polymerization times of from 1 to 10 minutes are preferred for most polymerization systems.

The lactam monomer and polyol used in the polymerization have both been described in ample detail above. The lactam polymerization catalyst useful herein includes that class of compounds commonly recognized as suitable basic catalysts for the anhydrous polymerization of lactams. In general, all alkali or alkaline earth metals are effective catalysts either in the metallic form or in the form of hydrides, halohydrides, alkylhalides, oxides, hydroxides, carbonates and the like.

Also useful are a number of organometallic compounds of the metals mentioned above such as metal alkyls, metal phenyls, metal amides and the like. Examples include sodium hydride, potassium hydroxide, lithium oxide, ethyl magnesium bromide, calcium fluorohydride, strontium carbonate, barium hydroxide, methyl sodium butyl lithium, potassium phenyl, diphenyl barium, sodium amide and magnesium diethyl. All of the foregoing compounds react with the lactam monomer to form the metal lactam, which is the active catalytic agent in the lactam polymerization mechanism. The metal lactam catalyst can therefore be formed in situ by reaction of one of the foregoing metals or metal compounds with lactam monomer in the polymerization medium or by prior reaction of the metal or metal compound with a stoichiometric quantity of lactam monomer. Examples of metal lactam catalysts include sodium caprolactam, magnesium caprolactam, bromomagnesium pyrrolidinone, chlorocalcium caprolactam and the like. Catalyst concentrations can range from a fraction of one mole percent to 15 or 20 or more mole percent of the lactam monomer to be polymerized.

The polyacyl or acyl linkages, as well as the ester and amide linkages, are incorporated into the polymer chain through the reaction of the polyacyl lactam or acyl polylactam with the lactam and polyol constituents. In the formula set forth above for the polyacyl lactams useful herein, the R group can be any hydrocarbon group having the necessary number of available valences to bond to itself all of the acyl groups included in the compound. The hydrocarbon group can be of any size but preferably contains a maximum of eight or ten carbon atoms. Examples of suitable R groups include phenylene, biphenylene, methylene, hexylene, tolylene, and analogous hydrocarbons having more than two sites available for bonding to acyl groups. The integer y preferably is from one to about three. The A group can be carbonyl, thiocarbonyl, or sulfonyl, and the A' group can be the same as A as well as phosphoryl. The Y group can represent any alkylene chain having from 3 to 14 or more carbon atoms, preferably from about 3 to about 10 carbon atoms. Preferred among the class of polyacyl lactams included within the scope of the formula given above are those where the A and A' groups are carbonyl groups. Particularly preferred are those compounds where A and A' are carbonyl, where R is either alkylene or phenylene, Y is a five-membered alkylene group and the integer y is one.

Examples include terephthaloyl bis-caprolactam, i.e.

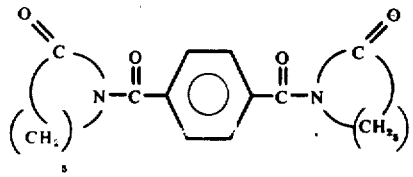

adipoyl bis-caprolactam; malonyl bis-pyrrolidinone: succinoyl bis-pyrrolidinone; glutaroyl bis-piperidone; glutaconoyl bis-peperidone; 2-ethyl-2-phenyl-glutaroyl bis-valerolactam; 2,3-diethyl-succinoyl bis-caprolactam; pimeloyl bis-capryllactam; sebacoyl bis-caprolactam phthaloyl bis-peperidone; isophthaloyl bis-dodecanolactam; 1,3,5-benzene tricarbonyl- tris-caprolactam; 1,2,3,5-benzenetetracarbonyl tetrakiscaprolactam; 1,2,3,4-naphthalenetetracarbonyl-tetrakis-piperidone and 1,4-cyclohexanedicarbonyl biscaprolactam; 1,3-benzene disulfonyl caprolactam; 3-(sulfonyl caprolactam)-benzoyl caprolactam; phosphoryl tris-caprolactam; benzene phosphoryl bis-caprolactam; and dithioterephthaloyl bis-caprolactam.

The amount of polyacyl lactam or acyl polylactam useful in the preparation of the terpolymers of this invention depends upon the quantities of lactam and polyol being used. For preferred polymerizations, it is desirable that the polyacyl lactam or acyl polylactam be present in an amount from 100 to about 500, preferably from about 100 to about 200, equivalent percent of the polyol. If the polyacyl lactam or acyl polylactam is present in an amount less than a molecularly equivalent amount based on the polyol, polyol prepolymer formation occurs, but the subsequent lactam polymerization is very slow. In those preferred polymerization systems where the polyacyl lactam or acyl polylactam concentration exceeds the amount stoicheiometrically equivalent to the polyol, the excess can be from 0.01 to about 30 or more mole percent of the lactam monomer. A preferred range is from about 0.1 to about 10 mole percent of the lactam monomer; and more preferably from about 0.2 to about 5 mole percent of the lactam monomer.

The lactam and polyol can be present in any relative proportions ranging up to 99 parts of either component to 1 part of the other. Preferred ratios of the two polymer-forming materials depend upon the end use to which the finished polymer is to be put. For end use applications requiring strong rigid materials, the lactam content of the polymerizable medium should be relatively high such as 60 or 80 or even 90% or more lactam. For other applications where elastomeric properties such as high elongation or where water absorption is desirable, the relative proportions of the two monomers can be reversed so that the polymerizable medium will contain 60 or 80 or 90% or more of the polyol compound. Polymers containing about equal quantities of both lactam and polyol are preferred for a great many uses because of the advantageous combination of properties achieved by such polymers.

EXAMPLE 1

A charge of 325 grams Voranol 2000 (polyoxypropylene polyol having a molecular weight of about 2000), 118 grams caprolactam, 60.9 grams isophthaloyl-bis-caprolactam, and 2.5 grams Flectol H (polymerized 1,2-dehydro-2,2,4-trimethylquinoline) stabilizer was introduced into a reaction chamber equipped with stirrer, thermal controller, nitrogen inlet, and vacuum distilling head. The mixture was heated under vacuum (<1mm) to remove moisture by distillation of 50 grams of caprolactam. The vacuum was released to nitrogen atmosphere and the solution cooled to 100° C. Dissolved nitrogen was removed under vacuum followed by the addition of 2.3 ml decyl alcohol and mixing of the resulting solution by stirring under nitrogen. The solution was catalyzed and cast into a stainless steel vertical sheep press maintained at 100° C by means of gear pumps. The solution was delivered into the press at a rate of 876 ml/min. The catalyst solution (0.4 molar bromomagnesium caprolactam) was injected into the solution stream by a second gear pump at a rate of 103 ml/min. resulting in a catalyst concentration of 12 millimoles catalyst per mole of caprolactam. After casting the press was heated to 160° C.

Seven lactam-polyol-polyacyl lactam terpolymers were prepared and cast using the process of Example 1, however the alcohol, and alcohol concentration were varied as indicated in Table 1 below. The results of Example 1 are recorded as run number 1 of Table 1 wherein the decyl alcohol presence was 90% molar equivalence of excess imide based on the molar equivalence of hydroxy present. The aforementioned % of alcohol presence is also representative of the % ester termination contained in the resulting terpolymer.

of caprolactam. The vacuum was released to nitrogen atmosphere and the resulting solution was cooled to 70° C and degassed of dissolved nitrogen present. The cooling and degassing was followed by the addition of from 0 to 4.8 ml decyl alcohol and mixing of the solution. Catalyst, 3.3 ml of 2 molar bromomagnesium pyrrolidone in N-methyl pyrrolidone was mixed with Table 1

| | Effect of Decyl Alcohol | | | | |
|---|---|---|---|---|---|
| | % molar equivalence alcohol of excess imide based on molar equivalence of polyol hydroxyl | Tensile | | | |
| Run No. | | strength fail psi | Elongation at break | Modulus psi × $10^{-3}$ | 230° C Melt Index |
| 1 | 90 | 1840 | 1100 | 4.3 | 54 |
| 2 | 65 | 2280 | 1200 | 3.0 | 37 |
| 3 | 0 | 1640 | 800 | 1.9 | 0.09 |
| | Effect of 2-Octonal | | | | |
| 4 | 90 | 2200 | 793 | 1.3 | 37.2 |
| 5 | 50 | 1360 | 667 | 5.0 | 16.2 |
| 6 | 40 | 1790 | 923 | 4.4 | 2.4 |
| 7 | 0 | 1580 | 828 | 0.79 | 0.14 |

EXAMPLE 2

A charge of 150 grams of Voranol 2000, 119 grams of caprolactam, 29.2 grams isophthaloyl-bis-caprolactam and 1.5 grams of Flectol H stabilizer was introduced into a reaction chamber equipped with stirrer, thermal controller, nitrogen inlet, and vacuum distilling head. The mixture was heated under vacuum (<1mm) to remove moisture by distillation of 25 grams of caprolactam. The resulting solution was cooled to 100° C and dissolved nitrogen was removed under vacuum, followed by the addition of 1.7 ml decyl alcohol and mixing of the solution. The solution was catalyzed and cast into a stainless steel vertical sheet press by means of gear pumps. The solution was delivered into the press at a rate of 876 ml/min. The catalyst solution (0.4 molar bromomagnesium caprolactam) was injected into the solution stream by a second gear pump at a rate of 99 ml/min. resulting in a catalyst concentration of 8 millimoles catalyst per mole caprolactam. Six lactam-polyol-polyacyl lactam terpolymers were prepared and cast using the process of Example 1, however the decyl alcohol presence was varied between 0 and 75% as defined in Table 1 as well as the solution and mold temperatures as presented in Table 2 below. The results of Example 2 are recorded as run 2 of Table 2.

the solution and the resulting mixture was poured into a stainless steel vertical press. The press was maintained at 100° C during the introduction of the polymer solution and was then heated 160° C during a 15 minute period followed by an additional 15 minute period at 160° C.

Table 3 presents the physical profiles of four terpolymers produced by the method of Example 3 with the concentrations of decyl alcohol varying from 0 through 90°, again alcohol percent presence defined as in Example 1.

Table 3

| | | | Effect of Decyl Alcohol | | | |
|---|---|---|---|---|---|---|
| | | | Tensile | | | |
| Run No. | % Decyl Alcohol | ml of Decyl Alcohol | Strength fail psi | % Elongation at break | Modulus psi × $10^{-3}$ | Melt Index |
| 1 | 0 | 0 | 7500 | | | 0.01 |
| 2 | 40 | 2.0 | 6400 | 497 | 76 | 0.3 |
| 3 | 67 | 3.3 | 6300 | 497 | 97 | 0.83 |
| 4 | 90 | 4.8 | 6000 | 467 | 80 | 2.5 |

EXAMPLE 4

The same procedure as in Example 3 was followed in producing the following terpolymers as described in Table 2

| | Effects of Decyl Alcohol, solution Temp. and Mold Temp. | | | | | |
|---|---|---|---|---|---|---|
| | | | | Tensile | | |
| Run No. | %* Decyl Alcohol | Solution Temp. °C | Mold Temp. °C | Strength Fail psi | % Elongation | Modulus psi × $10^{-3}$ | 250° C Melt Index |
| 1 | 0 | 100 | 100–160** | 3880 | 730 | 20.9 | 0.09 |
| 2 | 75 | ″ | ″ | 4790 | 720 | 16.7 | 3.4 |
| 3 | 0 | 100 | 160 | 2330 | 470 | 5.0 | 0.3 |
| 4 | 75 | ″ | ″ | 4790 | 770 | 21.1 | 3.8 |
| 5 | 0 | 160 | 160 | 2580 | 470 | 7.5 | 0.2 |
| 6 | 75 | 160 | 160 | 4490 | 745 | 18.9 | 3.9 |

*As defined in Example 1 and Table 1
**100° C. Initial temperature-increased to 160° C

EXAMPLE 3

A reactor vessel equipped with stirrer, thermal controller, nitrogen inlet, and vacuum distilling head was charged with 90 grams of a polyethylene glycol having a mole weight of about 3000, 219 grams caprolactam, 15.7 isophthaloyl-bis-caprolactam and 0.6 grams of Flectol H. The mixture was heated under vacuum (<1mm) to remove moisture by distillation of 25 grams Table 4 below, however the following concentrations of reagents were utilized: 90.0 grams polyethyleneglycol of molecular weight about 3000, 219 grams caprolactam, 0.6 grams Flectol H, 15.7 grams isophthaloyl-bis-caprolactam, from 0 to 2.0 ml of decyl alcohol, and 3.3 mls of 2 molar bromomagnesium pyrrolidone in N-methyl pyrrolidone.

Table 4

| Run No. | % Decyl Alcohol | Ml Decyl Alcohol | Tensile Strength Fail psi | % Elongation | Modulus psi × 10⁻³ | 250° C Melt Index |
|---|---|---|---|---|---|---|
| 1 | 0 | 0 | 6600 | 523 | 120 | 1.5 |
| 2 | 5 | 0.4 | 5900 | 410 | 130 | 2.7 |
| 3 | 11 | 0.8 | 5500 | 400 | 120 | 3.0 |
| 4 | 20 | 1.05 | 5600 | 410 | 110 | 3.4 |
| 5 | 40 | 2.0 | 4700 | 333 | 114 | 4.5 |

EXAMPLE 5

A reactor vessel equipped as in Examples 1 through 4 was charged with 75 grams Voranol 2000, 180 grams caprolactam, 1.25 grams Flectol H and 17.1 grams isophthaloyl-bis-caprolactam. The mixture was heated under vacuum (<1/mm) to remove moisture by distillation of 50 ml caprolactam. The resulting solution was cooled to 65° C and from 0.77 ml to 1.5 ml 1-propanol, or from 1.1 to 1.37 ml of 2-propanol added with stirring. Catalyst, 27.9 ml (0.4 molar bromomagnesium caprolactam in caprolactam) was added to the solution and stirred for 1 min., then the polymer solution was poured into the press of Example 1 (press temp. 100° C). The press was heated from 100° C to 160° C over a 20 minute period and held at 160° C for 1 hour. The physical profiles of these terpolymers are compared in Table 5 wherein the effect of 1-propanol and 2-propanol are demonstrated.

Table 5

| Run No. | % 1-Propanol | Ml 1-propanol | Tensile Strength Fail | % Elongation | Modulus psi × 10⁻³ | 250° C Melt Index |
|---|---|---|---|---|---|---|
| | | | Effect of 1-Propanol | | | |
| 1 | 50 | 0.77 | 4870 | 472 | 107 | 0.1 |
| 2 | 75 | 1.1 | 4450 | 173 | 99 | 0.2 |
| 3 | 90 | 1.35 | 5010 | 505 | 81 | 0.8 |
| 4 | 100 | 1.5 | 4400 | 176 | 62 | 1.4 |
| | | | Effect of 2-Propanol | | | |
| 1 | 75 | 1.1 | 4430 | 425 | 90 | 0.14 |
| 2 | 90 | 1.37 | 4510 | 175 | 101 | 0.7 |

Physical profiles as illustrated in Tables 1 through 5 demonstrate the effects of several monohydric alcohols upon the terpolymers of the invention. Improved melt index resulted with increasing alcohol concentration thus indicating a decrease of melt viscosity of the terpolymers in all runs. Both improved strength as well as improved melt flow characteristics were achieved with, for example, the higher concentration polypropylene glycols. The temperature-alcohol presence study presented in Table 2 demonstrates the flexibility of alcohol modified, ester terminated terpolymers, for example, in the elimination of the requirements of two temperature stage polymerization. The mole % alcohol of all examples and tables is based on the excess imide concentration and corresponds approximately with the % of prepolymer imide end groups which are replaced by ester groups, and according to the invention the corresponding % of ester end group termination of the lactam polyol-polyacyl lactam or lactam-polyol-acyl polylactam terpolymers.

What is claimed is:

1. A lactam-polyol-polyacyl lactam block terpolymer or a lactam-polyol-acyl polylactam block terpolymer having at least about 5% ester end group termination and the general formula:

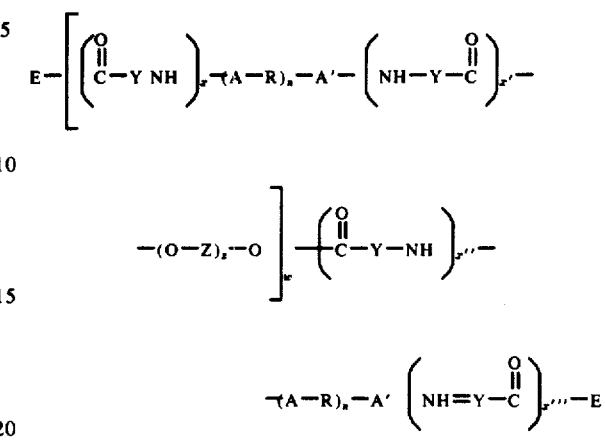

wherein (O—Z)$_z$ is a polymeric moiety and Z is a hydrocarbon or substituted hydrocarbon group said group being alkylene, arylene, alkylene carbonyl, arylene carbonyl, and mixtures thereof; A and A' are acyl groups selected from

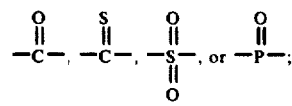

R is a divalent hydrocarbon group;
n is an integer equal to zero or one;
E is an amide group of the formula

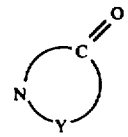

or an ester group of the formula —O—R' where the —O—R' is the residual of a monohydric functional alcohol; and
   Y is an alkylene or substituted alkylene having from about 3 to about 14 carbon atoms;
   R' is an aliphatic or substituted aliphatic hydrocarbon wherein the ester group is attached to other than a cyclic or aromatic radical;
   x, x', x", and x''' are integers and the total number of x's is equal to 2w + 2; and z and w are integers equal to one or more.

2. A block terpolymer according to claim 1 wherein the lactam portion of the terpolymer is formed from a lactam of the formula

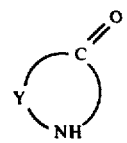

where Y is an alkylene group having at least about 3 carbon atoms.

3. A block terpolymer according to claim 2 wherein the lactam is ε-caprolactam.

4. A block terpolymer according to claim 1 wherein the polyol portion of the terpolymer is formed from alkylene glycol.

5. A block terpolymer according to claim 4 wherein said alkylene glycol is a polyalkyelen glycol having a molecular weight of at least about 1000.

6. A block terpolymer according to claim 5 wherein said polyalkylene glycol is polyethylene glycol.

7. A block terpolymer according to claim 5 wherein said polyalkylene glycol is polypropylene glycol.

8. A block terpolymer according to claim 5 wherein said polyalkylene glycol is polytetramethylene glycol.

9. A block terpolymer according to claim 1 wherein the polyol portion of the terpolymer is formed from polybutadiene diol.

10. A block terpolymer according to claim 1 wherein the polyol portion of the terpolymer is formed from a polyester.

11. A block terpolymer according to claim 10 wherein said polyester is polycaprolactone diol.

12. A block terpolymer according to claim 1 wherein the acyl groups of all of said ester and amide linkages are carbonyl groups.

13. A copolymer according to claim 3 wherein said block terpolymer is of the repeating AB block structure.

14. A copolymer according to claim 1 wherein said terpolymer is a caprolactam-polyalkylene glycol block polymer with phthaloyl linkages between the blocks.

15. A process for preparing a lactam-polyol-polyacyl lactam block terpolymer or a lactam-polyol-acyl polylactam block terpolymer or a lactam-polyol-acyl polylactam block terpolymer having the general formula:

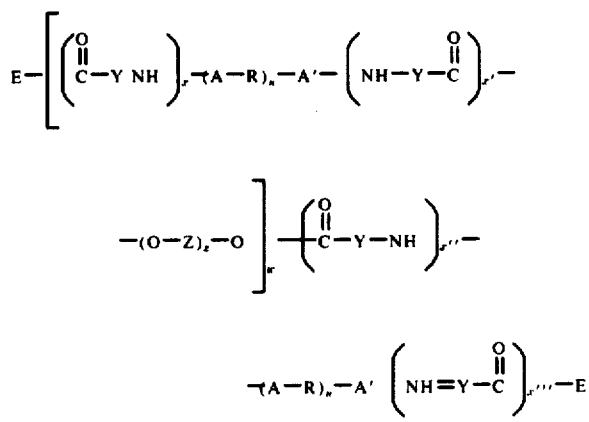

wherein $(O-Z)_z$ is a polymeric moiety and Z is a hydrocarbon or substituted hydrocarbon group said group being alkylene, arylene, alkylene carbonyl, arylene carbonyl, and mixtures thereof; A and A' are acyl groups selected from

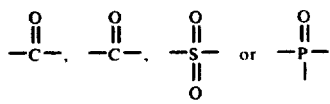

R is a divalent hydrocarbon group;
n is an integer equal to zero or one;
E is an imide group of the formula

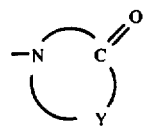

or an ester group of the formula $-O-R'$; where the $-O-R'$ is the residual of a monohydric functional alcohol.

Y is an alkylene or substituted alkylene having from about 3 to about 14 carbon atoms;

R' is an aliphatic or substituted aliphatic hydrocarbon wherein the ester group is attached to other than a cyclic or aromatic radical;

$x, x', x''$, and $x'''$ are integers and the total number of $x$'s is equal to $2w + 2$; and $z$ and $w$ are integers equal to one or more, comprising mixing together lactam monomer, polyol, monohydric alcohol, basic lactam polymerization catalyst and polyacyl lactam or acyl polylactam and polymerizing the lactam, polyol and polyacyl lactam or acyl polylactam to form block terpolymer, having at least 5% ester group termination.

16. A process according to claim 15 wherein said polyol, alcohol, and polyacyl lactam or acyl polylactam are reacted before said lactam is added to the polymerization mixture.

17. A process according to claim 8 wherein said polyol, alcohol, and polyacyl lactam of acyl polylactam are reacted before said lactam polymerization catalyst is added to the polymerization mixture.

18. A process according to claim 15 wherein said polymerization catalyst is an alkali metal or alkaline earth metal lactam or a halogenated alkaline earth metal lactam.

19. A process according to claim 18 wherein said polymerization catalyst is a bromomagnesium lactam.

20. A process according to claim 15 wherein said alcohol is functionally monohydric.

21. A process according to claim 20 wherein said monohydric functional alcohol has the formula ROH where R is an aliphatic or substituted aliphatic hydrocarbon.

22. A process according to claim 20 wherein said functionally monohydric alcohol having the formula ROH is comprised of polymeric R groups which are soluble in lactam.

23. A process according to claim 20 wherein said alcohol presence is from about 5% to about 150% of the molar equivalents of excess imide groups from acyl polylactam or polyacylactam based on the molar equivalents of hydroxyl from polyol present.

24. A process according to claim 21 wherein said alcohol is at least one of decyl, 2-octano, and 1-propanol.

25. A process according to claim 15 wherein said acyl polylactam is an acyl bis-lactam.

26. A process according to claim 15 wherein said polyacyl lactam is a bis-acyl lactam.

27. A process according to claim 20 wherein said bis-acyl lactam is terephthaloyl bis-caprolactam.

28. A process according to claim 20 wherein said bis-acyl lactam is isophthaloyl bis-caprolactam.

29. A process according to claim 15 wherein the polymerization reaction of the lactam, polyol and polyacyl lactam is carried out at a temperature from about 90° to about 190° C.

30. A process according to claim 15 wherein the polymerizing is carried out at an initial temperature of about 70° to about 100° C and is increased to about 150° to about 180° C during the polymerization reaction.

* * * * *